US010309127B2

(12) United States Patent
Root

(10) Patent No.: US 10,309,127 B2
(45) Date of Patent: Jun. 4, 2019

(54) DOOR LOCK MECHANISM FOR ACTUATION OF THE LOCKING SLIDE OF A DISCONNECTOR ON A CONTROL BOX, AND A CORRESPONDING CONTROL BOX ARRANGEMENT

(71) Applicant: Rittal GmbH & Co. KG, Herborn (DE)

(72) Inventor: Paul Root, Bad Endbach (DE)

(73) Assignee: Rittal GmbH & Co. KG, Herborn (DE)

( * ) Notice: Subject to any disclaimer, the term of this patent is extended or adjusted under 35 U.S.C. 154(b) by 884 days.

(21) Appl. No.: 14/548,639

(22) Filed: Nov. 20, 2014

(65) Prior Publication Data
US 2015/0145261 A1 May 28, 2015

(30) Foreign Application Priority Data

Nov. 22, 2013 (DE) .................... 20 2013 105 328 U

(51) Int. Cl.
*E05B 65/52* (2006.01)
*H01H 9/22* (2006.01)
(Continued)

(52) U.S. Cl.
CPC .......... *E05B 65/52* (2013.01); *E05B 63/0052* (2013.01); *E05C 3/08* (2013.01);
(Continued)

(58) Field of Classification Search
CPC .. E05B 65/52; E05B 65/5246; E05B 65/5253; E05B 65/02; E05B 65/025;
(Continued)

(56) References Cited

U.S. PATENT DOCUMENTS 1,046,072 A * 12/1912 Jones ...................... E05B 85/24
292/223
1,099,626 A * 6/1914 Stevenson ............... E05C 3/124
292/226

(Continued)

FOREIGN PATENT DOCUMENTS

DE 102008019986 A1 11/2009

*Primary Examiner* — Alyson M Merlino
(74) *Attorney, Agent, or Firm* — Marshall & Melhorn, LLC

(57) ABSTRACT

A door lock mechanism for actuation of the locking slide of a disconnector on a control box, includes a setting mechanism, that may be disposed between a locking position and a released position and that is pre-loaded toward the locking position, wherein the setting mechanism comprises a shaft that is pivoted around a rotation axis, wherein the shaft comprises at a first end a first lever that may be coupled with the locking slide of a disconnector, and wherein the shaft comprises at a second end opposing the first end a second lever having an actuating bolt so that upon pivoting the second lever the first lever conducts a respective pivoting; and a locking nose to be mounted at the inside of a control box door wherein the locking nose comprises starting from its tip an approach slope turning into a catch that turns into a contour slope so that upon closing the control box door the actuating bolt is guided along the contour slope in direction of the release position and against the pre-load.

14 Claims, 5 Drawing Sheets

(51) Int. Cl.
  *H02B 1/38* (2006.01)
  *E05B 63/00* (2006.01)
  *E05C 3/08* (2006.01)
  *E05B 65/02* (2006.01)
  *E05B 15/02* (2006.01)

(52) U.S. Cl.
  CPC ............... *H01H 9/22* (2013.01); *H02B 1/38* (2013.01); *E05B 65/02* (2013.01); *E05B 2015/023* (2013.01); *Y10T 292/0949* (2015.04)

(58) Field of Classification Search
  CPC .. E05B 65/00; E05B 65/0042; E05B 63/0052; E05B 2015/023; E05B 2015/0265; E05B 15/022; H01H 9/20; H01H 9/22; E05C 19/10; E05C 19/12; E05C 19/14; E05C 19/145; E05C 3/06; E05C 3/08; E05C 3/122; E05C 3/16; E05C 3/162; E05C 3/167; E05C 3/38; Y10T 292/1043; Y10T 292/1051; Y10T 292/1052; Y10T 292/1055; Y10T 292/1059; Y10T 292/1062; Y10T 292/1056; Y10T 292/1054; Y10T 292/1076; Y10T 292/1077; Y10T 292/108; Y10T 292/702; H02B 1/38; G06F 1/184–186; Y10S 292/71
  USPC .......... 200/50.01, 50.02–50.06, 50.18, 50.19
  See application file for complete search history.

(56) References Cited

U.S. PATENT DOCUMENTS

| | | | | |
|---|---|---|---|---|
| 1,265,120 A * | 5/1918 | Schrader | ............. | E05B 65/0042 292/242 |
| 1,479,742 A * | 1/1924 | Rodgers | ............. | E05B 65/0042 292/226 |
| 1,532,447 A * | 4/1925 | Schrader | ............. | E05B 65/0042 292/241 |
| 1,539,058 A * | 5/1925 | Adolph | ............... | E05B 65/0042 292/242 |
| 1,539,858 A * | 6/1925 | Morrow | ............... | E05B 65/0042 292/221 |
| 1,670,783 A * | 5/1928 | Schrader | ............. | E05B 65/0042 292/196 |
| 1,934,917 A * | 11/1933 | Dorey | ................ | E05B 65/0042 292/242 |
| 2,083,458 A * | 6/1937 | Elwyn | ................ | E05B 65/0042 292/126 |
| 2,250,447 A * | 7/1941 | Dwyer | ............... | E05B 65/0042 109/63.5 |
| 2,255,919 A * | 9/1941 | Dwyer | ................ | E05B 63/246 292/242 |
| 2,256,447 A * | 9/1941 | Burke | ................ | E05B 65/0042 292/223 |
| 2,309,049 A * | 1/1943 | Curtiss, Jr. | .......... | E05B 65/0042 126/197 |
| 2,309,507 A * | 1/1943 | Hogg | ................ | E05B 65/0042 292/221 |
| 2,344,636 A * | 3/1944 | Quast | ................ | H01H 9/22 200/50.18 |
| 3,045,465 A * | 7/1962 | Larson | ................ | E05C 3/162 292/223 |
| 3,059,072 A * | 10/1962 | Frey | ................ | H01H 9/223 200/50.15 |
| 3,207,880 A * | 9/1965 | Mekelburg | ............... | H01H 9/22 200/330 |
| 3,213,224 A * | 10/1965 | Mrenna | ................ | H01H 9/22 200/50.15 |
| 3,229,056 A | 1/1966 | Turnbull | | |
| 3,629,536 A * | 12/1971 | Rys | ................ | H01H 9/22 200/294 |
| 3,801,765 A * | 4/1974 | Hodgson | ................ | H01H 3/46 200/401 |
| 4,168,417 A * | 9/1979 | Puetz | ................ | H01H 3/46 200/329 |
| 4,447,858 A * | 5/1984 | Farag | ................ | H02B 11/127 200/50.24 |
| 4,626,638 A * | 12/1986 | Samples | ................ | H01H 3/36 200/331 |
| 4,750,569 A * | 6/1988 | Flogaus | ................ | E05C 9/025 292/196 |
| 4,769,739 A * | 9/1988 | De Bruin | ............... | H01H 9/047 200/50.1 |
| 4,839,477 A * | 6/1989 | Orosz | ................ | H01H 11/0006 200/50.21 |
| 5,424,911 A * | 6/1995 | Joyner | ................ | H02B 11/173 200/50.06 |
| 6,513,890 B1* | 2/2003 | Tolnes | ................ | E05B 65/46 292/336.3 |
| 7,558,052 B1* | 7/2009 | Coomer | ................ | H02B 11/02 200/306 |
| 2002/0084728 A1* | 7/2002 | Elm | ................ | H02B 1/38 312/222 |
| 2008/0295416 A1* | 12/2008 | Kintz | ................ | E05B 63/0052 49/506 |
| 2009/0065339 A1* | 3/2009 | Blankemeyer | ......... | H01H 71/52 200/336 |
| 2015/0129397 A1* | 5/2015 | Jang | ................ | H01H 9/22 200/50.19 |
| 2015/0131208 A1* | 5/2015 | Cloran | ................ | H01H 9/22 361/622 |

\* cited by examiner

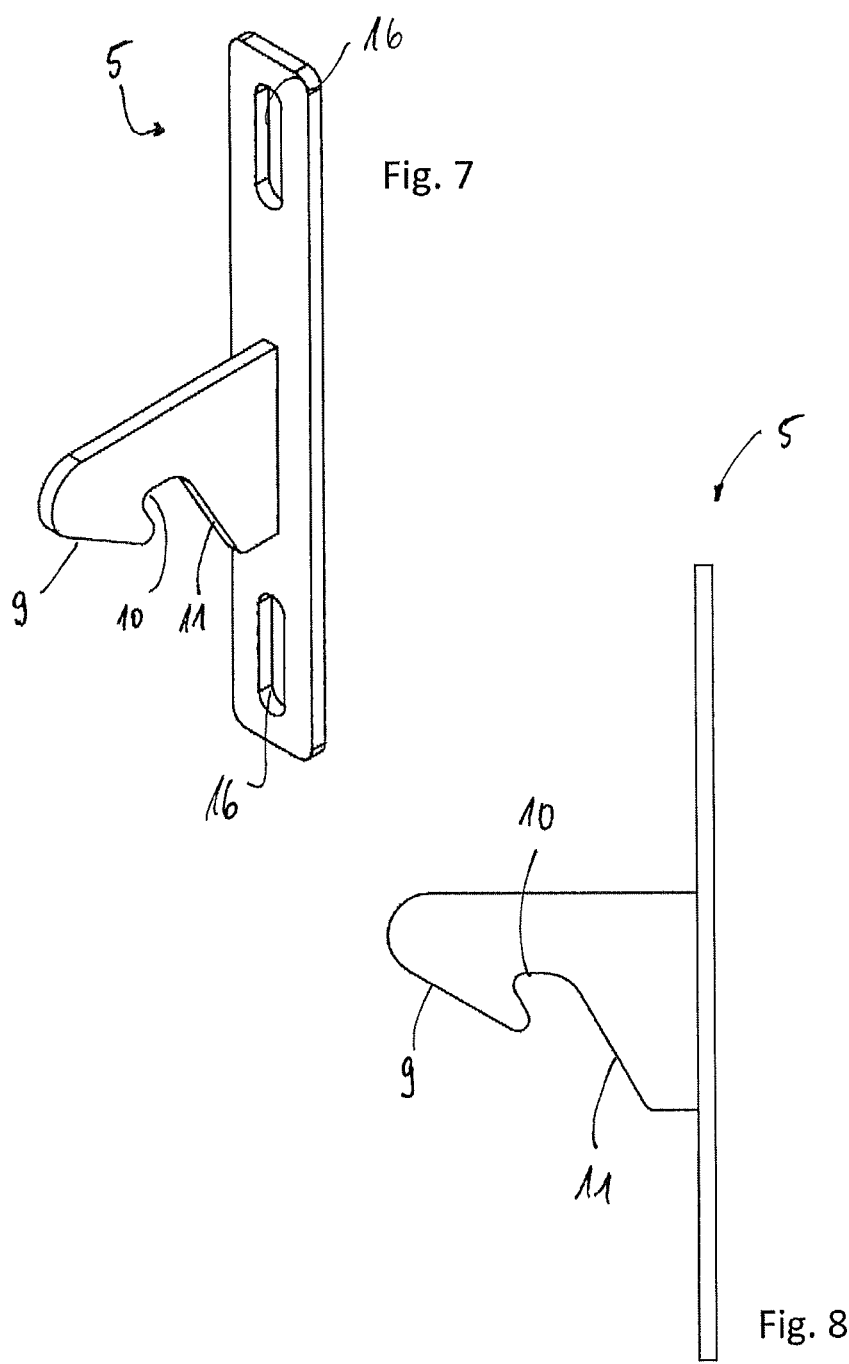

DOOR LOCK MECHANISM FOR ACTUATION OF THE LOCKING SLIDE OF A DISCONNECTOR ON A CONTROL BOX, AND A CORRESPONDING CONTROL BOX ARRANGEMENT

BACKGROUND OF THE INVENTION

The invention relates to a door lock mechanism for actuation of the locking slide of a disconnector on a control box, and a corresponding control box arrangement.

Disconnectors are used to increase the operating safety of control boxes. In order to avoid that a user suffers an electric shock when he touches the current-carrying control box installation, the control box door may only be opened, when the actuation mechanism of the electronic disconnector provided at the front side of the control box arrangement is brought into an off-position. Thereby, the disconnector switches off the voltage supply of the control box arrangement and unlocks the control box door mechanically. Thereupon the control box door may be opened safely by actuating the door handle.

Such control box arrangement comprising a door lock mechanism is known from U.S. Pat. No. 3,229,056. In this arrangement the actuating lever for the disconnector is located at the front side of the control box arrangement on a side strip, wherein the electric switch itself is located in the inside of the control box. The control box arrangement comprises a control box door having a push rod lock comprising an actuating lever that acts together with a setting mechanism of the door lock mechanism for actuation of the locking slide of the disconnector. Actuation of the locking slide is therefore related to the setting position of the push rod lock, so that it is not clear when the control box door is closed whether the disconnector is released or locked.

DE 10 2008 019 986 B4 discloses a control box arrangement, wherein at one side of the control box a disconnector hood is connected with the frame of the control box. A disconnector is mounted at a face side of the disconnector hood and from the outside and extends with its locking slide and with its actuating slide into the inside of the disconnector hood. By means of an actuating lever of the disconnector mounted at the outside of the disconnector hood, the actuating slide may only be switched from an off-position into an on-position when the locking slide is disposed in a release position in which it releases the actuating lever of the disconnector. By means of a complex setting mechanism the locking slide my only be moved into the release position when the control box door is placed in its completely closed position. However, the described locking mechanism is complex in manufacturing and its installation is complicated.

It is therefore an object of the invention, to provide a generic door lock mechanism for actuation of the locking slide of a disconnector as well as a respective control box arrangement that are inexpensive in manufacturing and that are easy to be installed.

SUMMARY OF THE INVENTION

This object is solved by a door lock mechanism for actuation of the locking slide of a disconnector on a control box. The mechanism includes a setting mechanism, that may be disposed between a locking position and a released position and that is pre-loaded toward the locking position, wherein the setting mechanism comprises a shaft that is pivoted around a rotation axis, wherein the shaft comprises at a first end a first lever that may be coupled with the locking slide of a disconnector, and wherein the shaft comprises at a second end opposing the first end a second lever having an actuating bolt so that upon pivoting the second lever the first lever conducts a respective pivoting. The mechanism also includes a locking nose to be mounted at the inside of a control box door wherein the locking nose comprises starting from its tip an approach slope turning into a catch that turns into a contour slope so that upon closing the control box door the actuating bolt is guided along the contour slope in direction of the release position and against the pre-load. A respective control box arrangement includes a frame having a control box door that is pivotably hinged at a first side thereof, and wherein a disconnector hood is mounted at a second side adjoining the first side in an orthogonal manner. A disconnector is mounted at a face side of the disconnector hood that extends into the interior of the disconnector hood by means of its locking slide and its actuating slide for an electric switch. The control box arrangement further comprises a door lock mechanism as described above, wherein the setting mechanism is mounted at a vertical profile section of the frame, the connecting bolt is connected with the locking slide and engages the passage of the first lever and wherein the actuating bolt of the second lever extends into the unobstructed opening of the frame at the door side. The locking nose is mounted from the inside at the vertical side of the control box door that is located opposing the hinge side of the control box door in such a way that upon closing of the control box door the locking nose impinges the actuating bolt with its approach slope.

The inventive door lock mechanism comprises a setting mechanism that may be adjusted between a locking position and a release position and that is pre-loaded toward the locking position. The setting mechanism comprises a shaft that is pivoted around a rotation axis, wherein the shaft comprises at a first end a first lever that may be coupled with the locking slide of a disconnector. The shaft further comprises at a second end opposite to the first end a second lever having an actuating stud. The first and the second lever are coupled by means of the pivoted shaft in such a way that upon pivoting of the second lever the first lever conducts a respective pivoting.

The door lock mechanism according to the present invention further comprises a locking nose to be mounted on the inside of a control box door, wherein the locking nose comprises starting from its tip first an approach slope that turns into a catch that turns into a contour slope, so that when the control box door is closed the actuating slide is guided along the contour slope and against the pre-load toward the release position.

The door lock position according to the present invention therefore distinguishes over the mechanisms known from the prior art that it comprises a construction that is considerably simpler. This is achieved in such a way that the pivoting required for actuation of the locking slide of the disconnector is communicated between the first and the second lever by means of a rotary motion of the shaft. By means of the particular contour of the contour slope a defined angular motion of the shaft between the locking position and the release position of the setting mechanism is achieved so that the setting mechanism reliably engages the released position only in case that the control box door is closed, wherein it is ensured by means of the catch that an unintentional opening of the control box door is impossible, if the actuating lever of the disconnector is placed in the on-position.

In order to simplify mounting of the door lock mechanism according to the present invention and to simplify its adjustment, respectively, it is provided in an embodiment of the invention that the second lever is connected with the shaft by means of a selectively releasable and lockable coupling in different angle positions with respect to the first lever. For that purpose the shaft may, for example, comprise a bushing in which a plug of the second lever is pivoted and may be arrested in a desired position with respect to the first lever. The arrest may be accomplished by means of grub screws, for example.

The first and the second lever may already be accomplished by means of simplest technical means. For example, it is provided in an embodiment of the invention that the first lever is a stepped molded part, preferably a molded part made of sheet metal that is connected to the shaft via a lower ledge of the shaft, and that comprises at its upper ledge a passage that engages a connecting bolt that may be connected with the locking slide of a disconnector. In order to further simplify the mounting of the door lock mechanism according to the present invention it may be provided that the passage is a slotted hole that is open at one end, so that the first lever comprises a fork by means of which the first lever engages the connecting bolt.

Also the locking nose may be formed by means of simplest technical means, for example, it may also be formed as a molded part of sheet metal. In an embodiment of the invention the closing nose comprises an undercut at its transition between the approach slope and the catch in which the actuating bolt is held because of the preload of the setting mechanism, so that it is ensured that upon unintentional opening of the control box door pivoting of the control box door is impossible when the actuating lever of the disconnector is still in the on-position. Commonly, the locking slide of the disconnector comprises a pre-load toward its locking position for the actuating lever of the disconnector, so that the setting mechanism of the inventive door lock mechanism does itself not necessarily comprise a spring element or the like for providing the pre-load.

In an embodiment of the invention the setting mechanism comprises a limiting slot describing a circular path section around the rotation axis and along which the second lever is guided. Preferably the second lever comprises a guiding pin by means of which it engages the limiting slot. This guiding pin may be formed as an extension of the actuating bolt, for example. Is it required that the installation is to be switched on with opened control box door, for example for the purpose of maintenance, the second lever is held by means of the limiting slot in the respective position in such a way that upon closing of the door in this state the actuating bolt is guided along the approach slope onto the contour slope of the locking nose.

With the disconnector in the on-position, opening of the control box door causes that the actuating bolt is not held by means of the contour slope of the locking nose in the release position anymore and is pushed into the catch of the locking nose due to the preload of the setting mechanism. The control box door is therefore effectively locked. Only by means of tilting back the actuating lever of the disconnector from the on-position into the off-position the second lever is lifted out of the catch by means of the locking slide of the disconnector, so that the control box door may be opened completely.

In another embodiment the setting mechanism comprises a marking displaying a required position of the second lever, if the setting mechanism is in the locking position. This embodiment allows that independent of the type of the used disconnector simple adjustment of the locking position of the setting mechanism with respect to the locking position of the locking slide of the disconnector is possible in any case. In particular, adjustment of the setting mechanism may be further simplified in such a way that the second lever is connected with the shaft of the setting mechanism by means of the above described selectively releasable and lockable coupling.

According to an embodiment of the invention also the second lever may be realized by means of simplest technical means. For that purpose it may be provided that the second lever comprises a plug that extends along the rotation axis and by means of which the second lever is connected with the shaft (releasably, if necessary), wherein the plug is connected with a cantilever of the second lever that extends radially with respect to the rotation axis, and wherein the actuating bolt is mounted to the cantilever parallel displaced from the plug. The cantilever may be a simple metal part having tapped bores at opposing ends for mounting the plug and the actuating bolt, respectively. At this end of the cantilever where the actuating bolt is mounted an indicator may be formed that aids adjustment of the second lever by means of the above described marking.

The control box arrangement according to the present invention comprises a frame having a control box door that is pivotably hinged at a first side thereof, and wherein a disconnector hood is mounted at a second side adjoining the first side in orthogonal orientation, wherein at a face side of the disconnector hood a disconnector is mounted that extends into the inside of the disconnector hood with its locking slide and its actuating slide for an electric switch. The control box arrangement further comprises a door lock mechanism of the above described type, wherein the setting mechanism is mounted at a vertical profile section of the frame. The connecting bolt is connected with the locking slide and engages the passage of the first lever. The actuating bolt of the second lever extends into the unobstructed opening of the frame facing the door. Thereby, the locking nose is mounted in such a way from the inside at the vertical side of the control box door that is located opposite to the hinge side of the control box door that upon closure of the control box door the locking nose impinges the actuating bolt by means of its approach slope. The latter ensures that the actuating bolt is held in the catch when the door is opened while the disconnector is switched-on.

With the aid of the door lock mechanism according to the present invention it is therefore possible with simplest technical means to provide a coupling between the locking slide of the disconnector as well as the actuating bolt of the second lever and the closed position of the control box door, respectively.

When the door lock mechanism is installed at the vertical profile section of the control box arrangement the setting mechanism is coupled with the locking slide of the disconnector via the passage in the first lever as well as the connecting bolt. Subsequently, the second lever is adjusted to the locking position by means of the aforementioned markings. Further, the locking nose should be mounted on the control box door inside in a position in which the actuating bolt engages in the closed position of the control box door a position on the contour slope in which the setting mechanism is in the released position, and in which the setting mechanism engages the locking position when the bolt is in the catch. For that purpose the locking nose may comprise a mounting plate comprising slotted holes extending in vertical direction which allow a slight height adjustment of the locking nose.

Furthermore, it may be provided that the disconnector is releasable by means of a pivoting of the control box door into a closed position wherein the actuating bolt is pushed via the contour slope against a pre-load mechanism.

In another embodiment the door lock mechanism is constructed symmetrically so that it may be mounted independent of the hinge side of the control box door at the side opposing the hinge side.

BRIEF DESCRIPTION OF THE DRAWINGS

Further details of the invention are described by means of the appending figures. Therein.

FIG. 7 shows a perspective view of the locking nose according to FIG. 2; and FIG. 8 shows a side view of the locking nose according to FIG. 2.

DETAILED DESCRIPTION OF THE INVENTION

Figure 1:
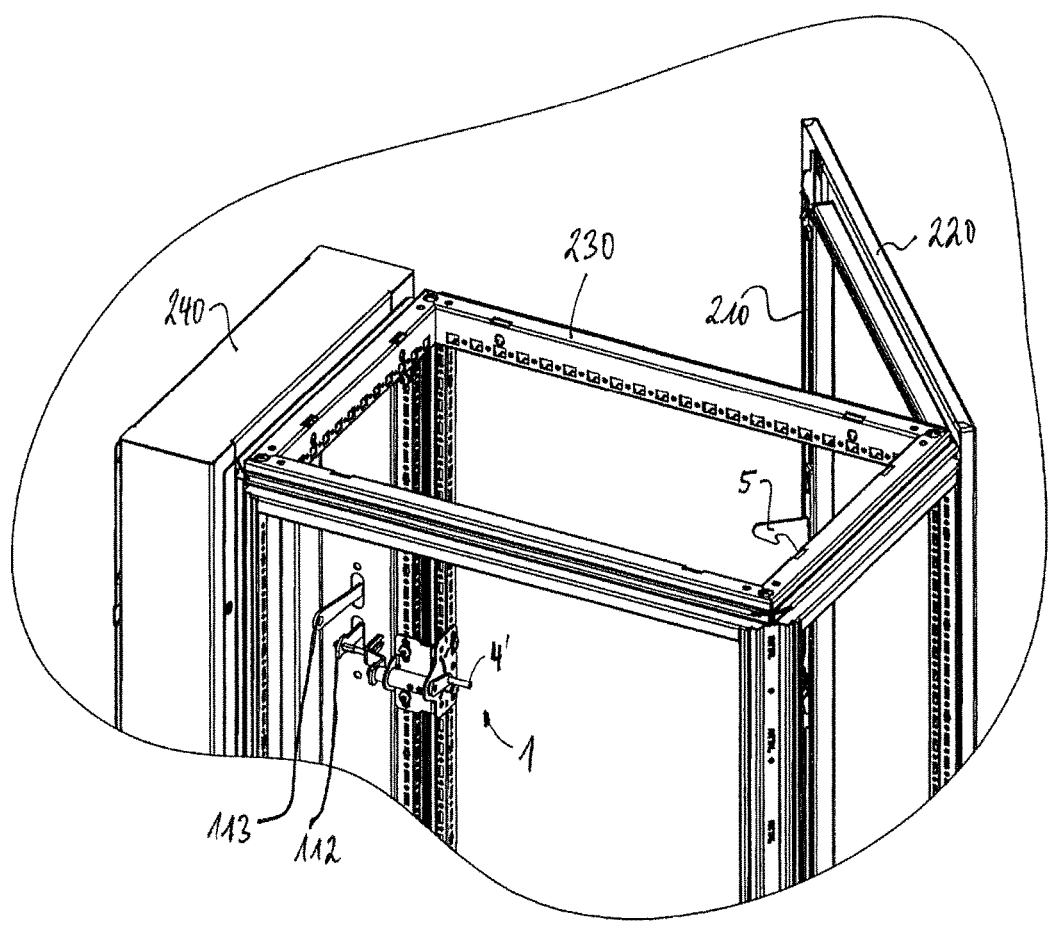
FIG. 1 shows a cut out of the a control box arrangement according to an embodiment of the invention.

The control box arrangement shown in FIG. 1 substantially consists of a frame 230 having four vertical profile sections and eight horizontal profile sections that build an ashlar-formed control box corpus. A control box door 220 is hinged at a front side formed of two vertical and two horizontal profile sections. A disconnector hood 240 is connected with the frame 230 at a side that is located orthogonal to the door side. The disconnector hood 240 expands the control box interior laterally. At the face side of the disconnector hood 240 averted in the illustration according to FIG. 1 a disconnector is mounted from the outside that extends into the inside of the disconnector hood 240 with its locking slide 112 and with its actuating slide 113. The locking slide 112 is coupled to the setting mechanism 1 by means of a connecting bolt. An actuating bolt 4' of the door locking mechanism 1 extends into the unobstructed opening of the frame 230 at the door side in order to interact with the locking nose 5 that is mounted at the interior side 210 of the control box door 220 upon pivoting the control box door 220 into its closed position.

Figure 2:
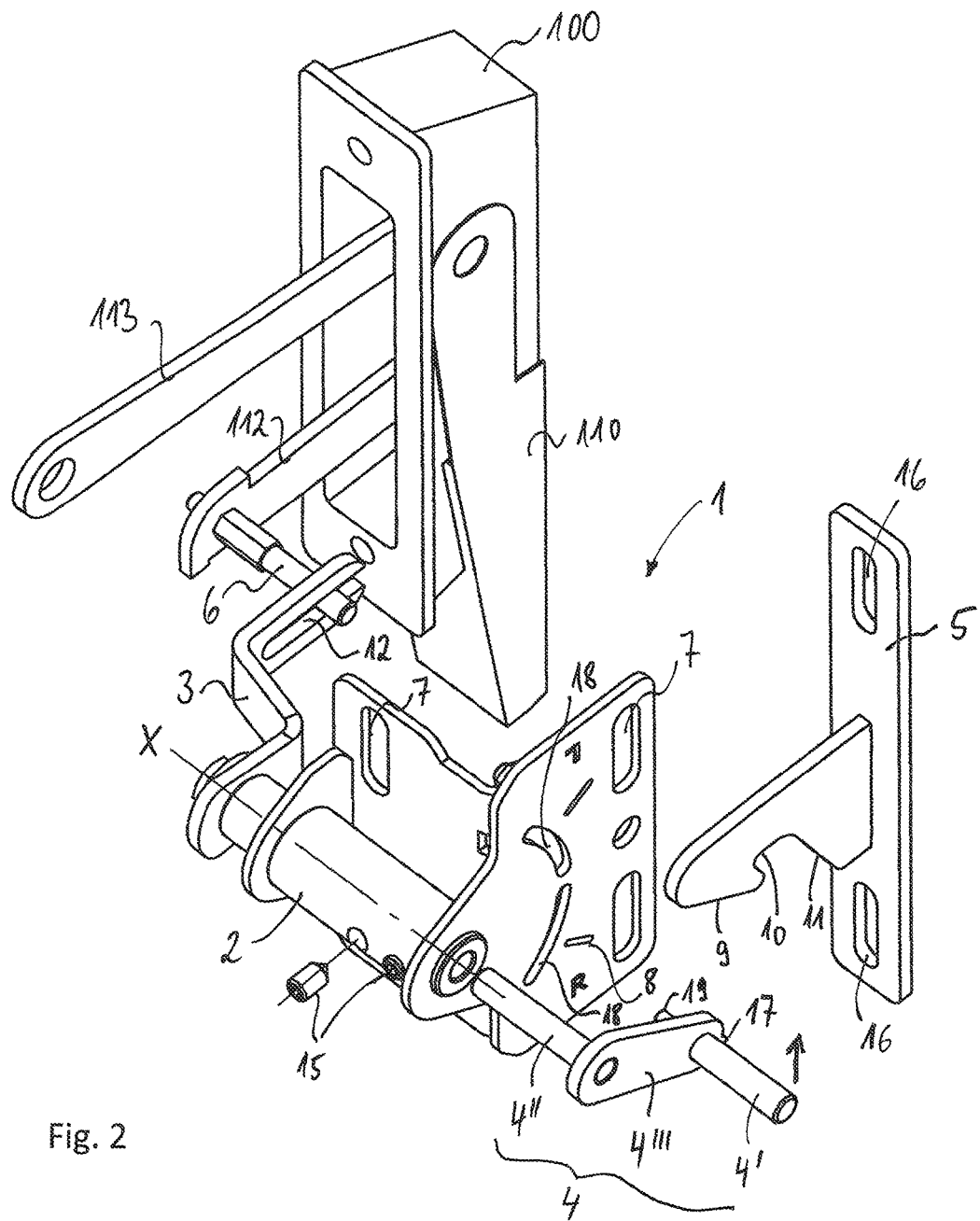
FIG. 2 shows a perspective view of the inventive door lock mechanism coupled with a disconnector according to an embodiment of the invention.

FIG. 2 shows in detail how the door lock mechanism 1 according to the present invention interacts with the disconnector 100. The disconnector 100 comprises an actuating slide 113 and a locking slide 112. The actuating slide 113 may be connected with an electric switch that may switch currentless the control box installations by means of a bowden cable. If the locking slide 112 is located in the release position, the actuating lever 110 may be pivoted from its off-position into its on-position. Thereupon, the actuating slide 113 is pivoted so that it is possible to access the electric switch in the inside of the control box from outside the control box in a safe manner.

The locking slide 112 is coupled with the first lever 3 of the setting mechanism of the door lock mechanism 1 by means of a connecting bolt 6 that extends orthogonal with respect to the locking slide 112. The connecting bolt 6 may comprise an external thread by means of which it is screwed into a corresponding internal thread of the locking slide 112, for example. The first lever 3 is formed as a stepped molded part from sheet metal, wherein it is connected, for example screwed, to the shaft 2 by means of a lower ledge. The upper ledge comprises an opening 12 having the form of a slotted hole that is opened toward the end of the upper ledge so that the connecting bolt 6 may be easily inserted into the opening 12.

The shaft 2 is mounted twistable around a rotation axis x at the corpus of the setting mechanism. The corpus of the setting mechanism is substantially formed from two simple molded parts from sheet metal that are screwed together.

While the first lever 3 is connected to the shaft 2 by means of a first end thereof, the second lever 4 is connected to the shaft 2 by means of a second end of the shaft 2 that is located opposite to the first end. The shaft 2 comprises a coupling at its end facing the second lever 4. For that purpose two grub screws 15 may be screwed into the shaft 2 from the outside, and that extend in a bore extending along the rotation axis x into the shaft 2 and that clamp a plug 4" of the second lever 4 in a desired position with respect to the shaft 2 and in particular with respect to the first lever 3 when the second lever 4 is inserted. The second lever 4 comprises a cantilever 4''' into which the plug 4" and the actuating bolt 4', respectively, is mounted, for example screwed, at opposing ends thereof. The plug 4" and the actuating lever 4' extend in opposing directions starting from the cantilever 4'''. While the plug 4" extends in direction of the coupling of the shaft 2, the actuating bolt 4' extends antiparallel with respect thereto. In direction of the plug 4" the actuating bolt 4" is elongated by means of a guiding pin 19 that engages a limiting slit in the corpus of the setting mechanism when the plug 4" is inserted into the coupling of the shaft 2. The corpus may be screwed together with the frame of a control box by means of a mounting reception having the form of slotted hole.

It may be seen easily in FIG. 2 that a pivoting of the actuating bolt 4' with the aid of the illustrated door lock mechanism 1 is translated into a respective pivoting of the locking slide 112. By means of the coupling formed between the shaft 2 and the second lever 4 a simple adjustment of the setting mechanism with respect to the locking position of the locking slide 112 is possible with the aid of the grub screws 15 and the plug 4". For example, it is possible to react upon different constructions of disconnectors 100 that may vary with respect to the locking position of the locking slide 112. A marking 8 is provided in the corpus of the door lock mechanism 1 as a reference for the adjustment of the second lever 4. For adjustment an indicator 17 may be directed to the marking 8 in the locking position of the locking in slide 112. In addition to that it is only required that the locking nose 5 is mounted at the door inside of the control box in such a way that the actuating bolt 4' engages in the closed position of the control box door a position on the contour slope 11 so that the actuating bolt 4' is pushed down along the contour slope 11 and the inhibition provided in the disconnector 100 is released so that the lever 110 of the disconnector may be tilted back. Further, the setting mechanism should engage the locking position when the bolt is located in the catch.

Figure 3:
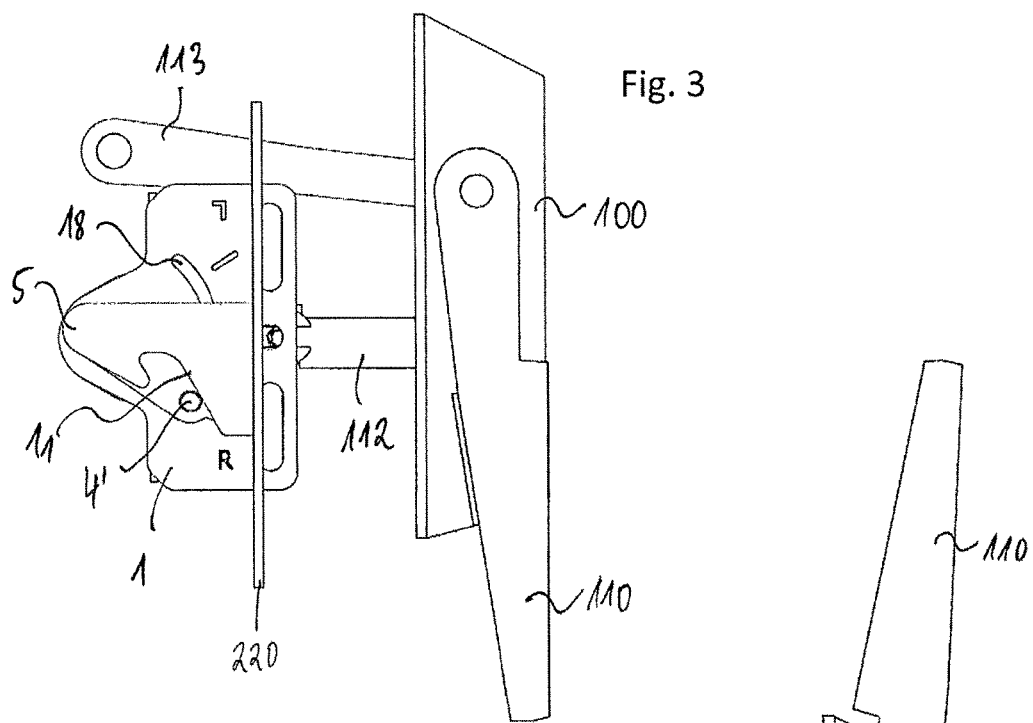
FIG. 3 shows a side view of the door lock mechanism according to FIG. 2, wherein the disconnector is located in the off-position.
Figure 4:
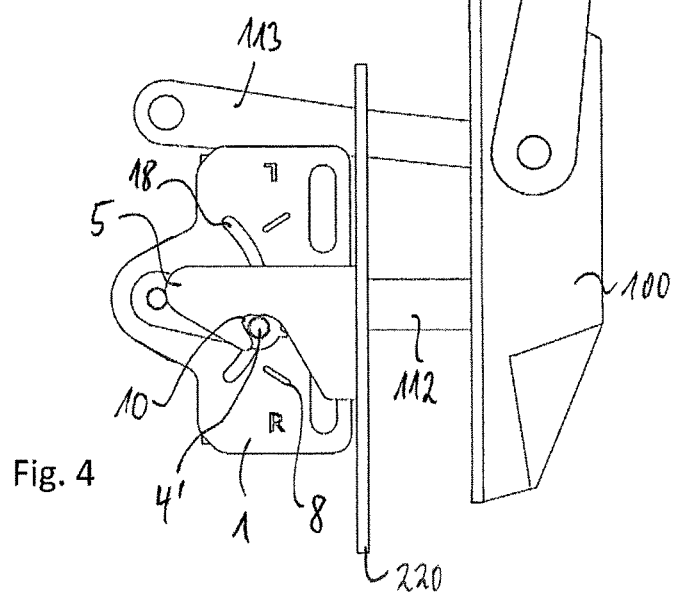
FIG. 4 shows the arrangement according to FIG. 3, wherein the disconnector is located in the on-position, and in the attempt to open the door.

FIGS. 3 and 4 show the inventive door lock mechanism 1 as well as an embodiment of a disconnector 100 in different positions of the actuating lever 110. When, as it is shown in FIG. 3, the actuating lever 110 is in the off-position, it may only be transferred into the on-position shown in FIG. 4 when the control box door 220 is closed so far that the actuating bolt 4' is transferred along the contour slope 11 until it reaches the release position of the setting mechanism.

FIG. 4 shows the case that the control box door 220 is opened when the control box installation is switched on. From this follows that when the control box door is opened the actuating bolt 4' is guided along the contour slope 11 into the catch 10 and is also kept there because of the pre-load of the locking slide 112 of the disconnector 100, so that an unintentional opening of the control box door is impossible.

Figure 5:
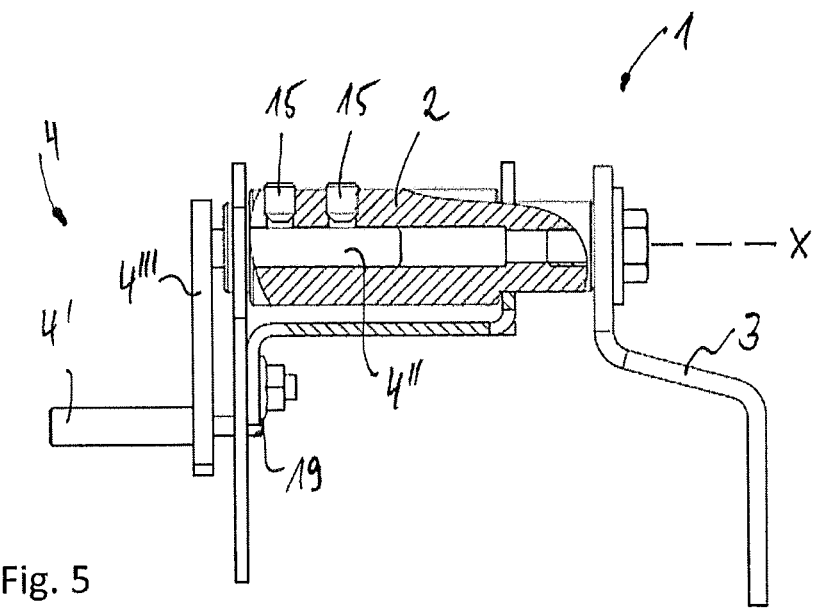
FIG. 5 shows a cross-section of the door lock mechanism according to FIG. 2.
Figure 6:
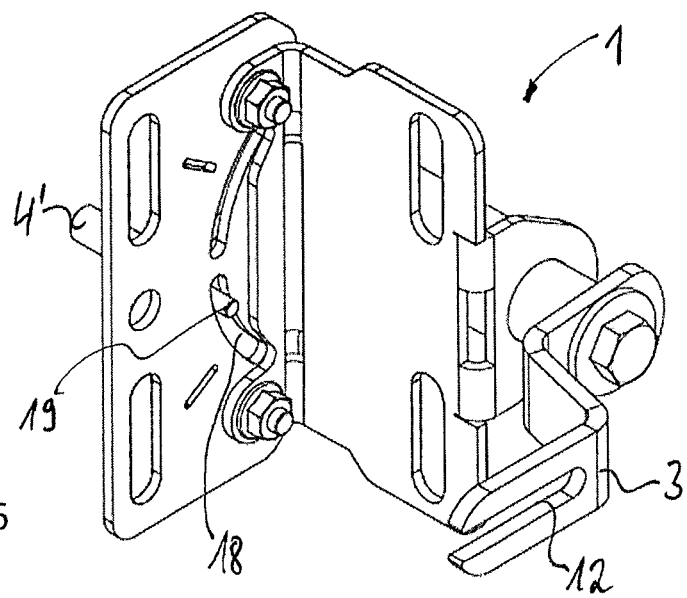
FIG. 6 shows a rear view of the door lock mechanism according to FIG. 2.

FIG. 5 shows that the coupling of the shaft 2 may be formed as a bore for receiving the second lever 4 in varying rotational orientations, wherein grub screws 15 may be screwed into threaded holes that are oriented radial with respect thereto in order to clamp a plug 4" of the second lever 4 in the shaft 2. The actuating bolt 4' extends by means of a guiding pin 19 through the cantilever 4''' and into a limiting slit 18 of the corpus. This is also shown in FIG. 6.

FIGS. 7 and 8 show the inventive locking nose 5 in a perspective view and in a side view. The locking nose 5 comprises a mounting side having slotted holes 16 by means of which the locking nose 5 may be screwed at the inside of a control box door. Starting from the tip the locking nose 5 comprises an approach slope 9 that turns into a catch 10, wherein an undercut is formed at a transition between the approach slope 9 and the catch 10. The catch 10 finally turns into a contour slope 11, wherein the contour slope 11 comprises an area that is located lower than the lowest point of the approach slope 9. This ensures that when the setting mechanism is adjusted as described before the setting mechanism reaches the release position only when the actuating plug is located in the lower area of the contour slope 11, but not when it is located in the lower area of the approach slope 9 and therefore still in front of the catch 10, for example.

The features disclosed in the preceding description, in the figures as well as in the claims may be essential for implementation of the invention taken alone or in any arbitrary combination.

REFERENCE NUMERALS

1 Door Lock Mechanism
2 Shaft
3 First Lever
4 Second Lever
4' Actuating Bolt
4" Plug
4''' Cantilever
5 Locking Nose
6 Connecting Bolt
7 Slotted Hole
8 Marking
9 Approach Slope
10 Catch
11 Contour Slope
15 Grub Screw
16 Slotted Hole
17 Indicator
18 Limiting Slit
19 Guiding Pin
100 Disconnector
112 Locking Slide
113 Actuating Slide
210 Control Box Door Inside
220 Control Box Door
230 Frame
240 Disconnector Hood
x Rotation Axis

What is claimed is:

1. A door lock mechanism in combination with a disconnector with a locking slide on a control box with a control box door, for actuation by the locking slide of the disconnector, said combination comprising
a setting mechanism disposable between a locking position and a released position and that is pre-loaded toward the locking position, wherein the setting mechanism comprises a shaft that is pivoted around a rotation axis, wherein at a first end of the shaft, the shaft comprises a first lever that is coupled with the locking slide of the disconnector on the control box, and wherein the shaft comprises, at a second end opposing the first end, a second lever having an actuating bolt such that pivoting of the second lever causes a corresponding pivoting of the first lever; and
a locking nose mounted on an inside of the control box door of the control box, wherein the locking nose comprises, starting from a tip thereof, an approach slope leading into a catch that leads into a contour slope so that upon closing of the control box door toward a closed position, the actuating bolt of the second lever is guided along the approach slope in a direction of the released position and against the pre-load.

2. The combination according to claim 1, wherein the second lever is connected to the shaft by means of a selectively releasable and lockable coupling, which is configured to connect the second lever in varying positions in relation to the first lever.

3. The combination according to claim 1, wherein the first lever is a stepped molded part that is mounted by means of a lower ledge on the shaft and that comprises a passage at its upper ledge engaged by a connecting bolt that is connectable with the locking slide of the disconnector.

4. The combination according to claim 3, wherein the passage is a slotted hole comprising an open end, so that the first lever comprises a fork by means of which the first lever engages the connecting bolt.

5. The combination according to claim 1, wherein the locking nose comprises an undercut at its transition between the approach slope and the catch.

6. The combination according to claim 1, wherein the setting mechanism comprises a limiting slit describing a circular path section around the rotation axis and along which the second lever is guided.

7. The combination according to claim 1, wherein the setting mechanism comprises a marking indicating a desired position of the second lever when the setting mechanism is located in the locking position.

8. The combination according to claim 1, wherein the second lever comprises a plug extending along the rotation axis and by which the second lever is connected with the shaft, wherein the plug is connected with a cantilever of the second lever extending radially with respect to the rotation axis, and wherein the actuating bolt is connected to the cantilever parallel to and displaced from the plug.

9. A control box arrangement comprising the door lock mechanism in combination with the disconnector with the locking slide on the control box according to claim 1, and further comprising a frame having the control box door that is pivotably hinged at a first side of the frame, and wherein a disconnector hood is mounted at a second side of the frame adjoining the first side in an orthogonal manner, wherein the disconnector is mounted at a face side of the disconnector hood and extends into an interior of the disconnector hood by the locking slide and the disconnector includes an actuating slide for an electric switch, wherein the setting mechanism is mounted at a vertical profile section of the frame, wherein a connecting bolt is connected with the locking slide and engages a passage of the first lever and wherein the actuating bolt of the second lever extends into an unobstructed opening of the frame so as to cooperate with the locking nose mounted on the inside of the control box door, and wherein the locking nose is mounted on the inside of the control box door at a vertical side of the control box door that is located opposing the first side of the frame to which the control box door is pivotably hinged in such a way that upon closing of the control box door toward the closed position, the locking nose guides the actuating bolt with its approach slope.

10. The control box arrangement according to claim 9, wherein the actuating bolt engages, when the control box door has moved to the closed position, a position on the contour slope in which the setting mechanism is located in the release position, and when the setting mechanism is in the locking position, the bolt is located in the catch.

11. The control box arrangement according to claim 9, wherein the disconnector is releasable in a closed position by means of a pivoting of the control box door.

12. The control box arrangement according to claim 9, wherein the door lock mechanism is constructed symmetrically, wherein the control box door comprises first and second edges, and either the first or the second edge of the control box door can comprise hinges, and the door lock mechanism is mountable independent of the edge of the control box door comprising hinges.

13. The door lock mechanism according to claim 3, wherein the stepped molded part is a part molded from sheet metal.

14. A door lock mechanism for a control box with a control box door, wherein:

the door lock mechanism is configured to be actuated by a locking slide of a disconnector on the control box;

the door lock mechanism comprising:

a setting mechanism disposable between a locking position and a released position and that is pre-loaded toward the locking position, wherein the setting mechanism comprises a shaft that is pivoted around a rotation axis, wherein at a first end of the shaft, the shaft comprises a first lever that is coupled with the locking slide of the disconnector on the control box, and wherein the shaft comprises, at a second end opposing the first end, a second lever having an actuating bolt such that pivoting of the second lever causes a corresponding pivoting of the first lever; and a locking nose mounted on an inside of the control box door, wherein the locking nose comprises, starting from a tip thereof, an approach slope leading into a catch that leads into a contour slope so that upon closing of the control box door, the actuating bolt of the second lever is guided along the approach slope in a direction of the released position and against the pre-load.

\* \* \* \* \*